United States Patent
Moslo

[15] 3,635,635
[45] Jan. 18, 1972

[54] BLOW MOLDING MACHINE WITH PRESSURE MEANS FOR HOLDING NECK AND BODY MOLD SECTIONS TIGHTLY TOGETHER DURING MOLDING OPERATIONS

[72] Inventor: Ernest P. Moslo, 12700 Lake Avenue, Lakewood, Ohio 44107
[22] Filed: June 11, 1970
[21] Appl. No.: 45,437

[52] U.S. Cl..............................425/326, 425/342, 425/387, 425/395, 425/441
[51] Int. Cl........................................................B29d 23/03
[58] Field of Search......................18/5 BA, 5 BC, 5 BJ, 5 BP, 18/5 BT, 5 BV, 5 BZ

[56] References Cited

UNITED STATES PATENTS 2,864,124  12/1958  Strauss....................................18/5 BJ
3,116,516  1/1964  Moslo......................................18/5 BJ Primary Examiner—H. A. Kilby, Jr.
Attorney—Baldwin, Egan, Walling & Fetzer

[57] ABSTRACT

A blow molding machine for producing for instance, plastic bottles, and wherein the machine molds the bottles on horizontally arranged parison and blow molds comprising a central parison mold and a pair of blow molds disposed generally on either side of the parison mold. The molds comprise upper and lower neck section mold halves and upper and lower body section mold halves with the halves being relatively movable with respect to one another for opening and closing the molds in a general vertical direction. The mold halves when closed define the mold cavity of the respective mold, and the neck mold sections are adapted for longitudinal abutting relation with the body sections during molding operations. Pressure-applying means are provided coacting with the mold sections to urge the latter longitudinally together for maintaining a tight abutting relationship between the neck mold sections and the body mold sections in the closed condition of the molds, so that leakage can not occur between the body and neck mold sections, while providing in the deactuated condition of the pressure-applying means, for ready opening and closing movement of the mold sections without interference between the neck mold sections and the body mold sections.

12 Claims, 12 Drawing Figures

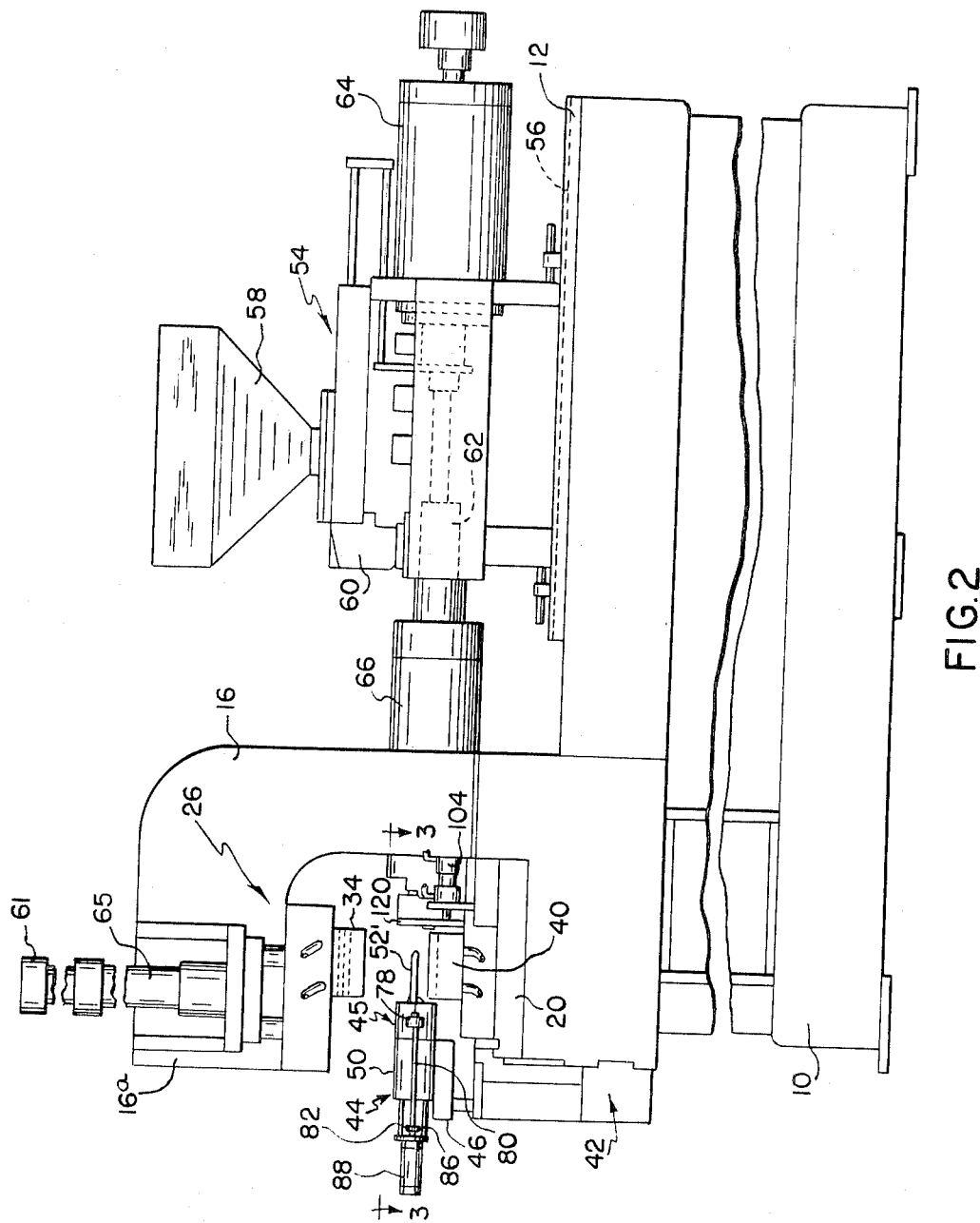

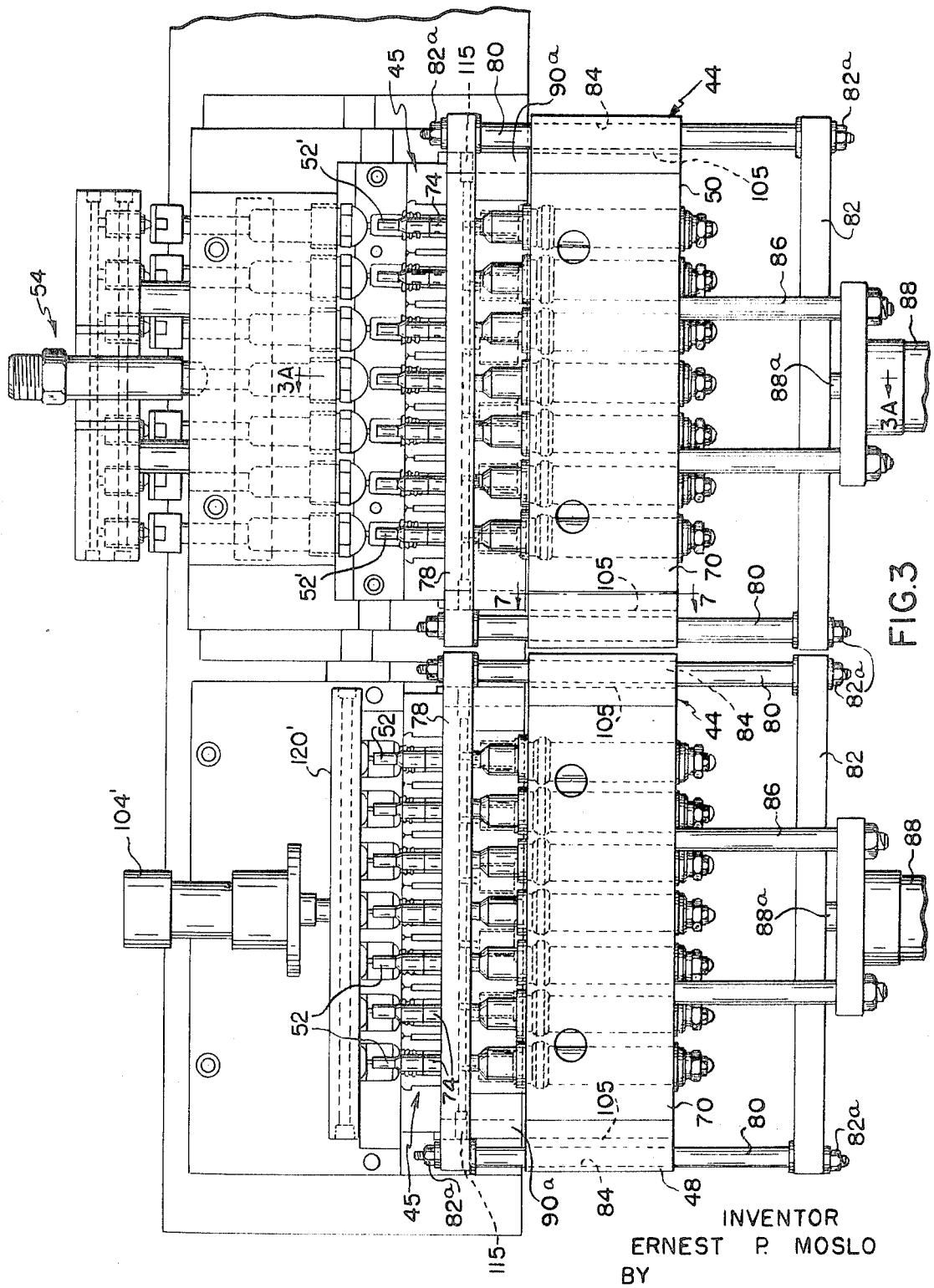

INVENTOR
ERNEST P. MOSLO
BY
Baldwin, Egan, Walling & Fetzer
ATTORNEYS

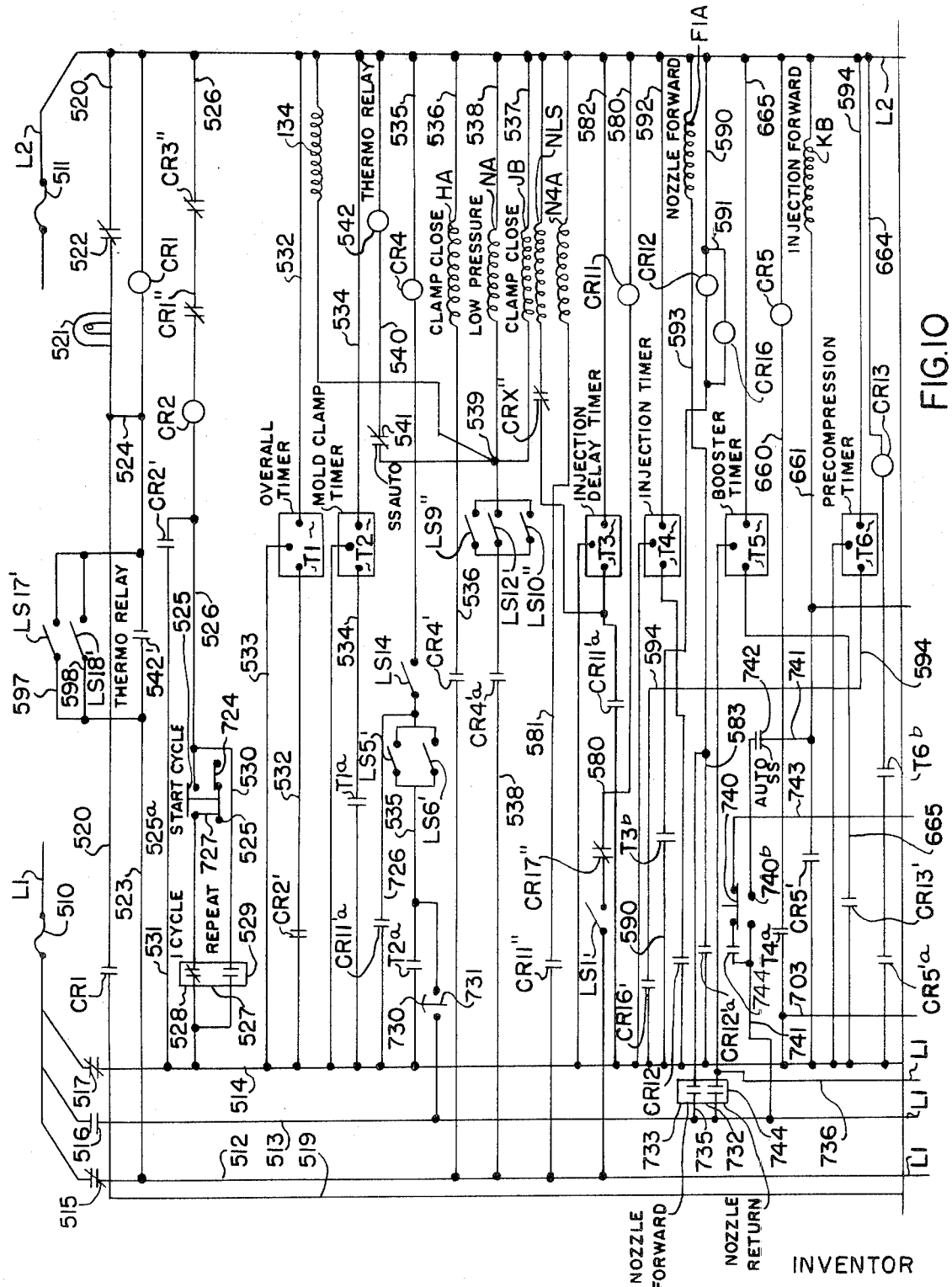

BLOW MOLDING MACHINE WITH PRESSURE MEANS FOR HOLDING NECK AND BODY MOLD SECTIONS TIGHTLY TOGETHER DURING MOLDING OPERATIONS

This invention relates in general to a parison type of bottle blowing machine and more particularly to parison-type bottle blowing machines having mold portions which are movable vertically relative to one another, and which include a body mold section and a neck mold section and wherein the mold sections are openable vertically for permitting discharge of the formed article from the respective mold. The molds may also have movable rear wall sections for providing for removal of the molded article from the blow mold when the rear or bottom wall of the formed article or bottle has an indented portion which would ordinarily cause interference between the mold and the formed article during removal of the latter from the mold.

BACKGROUND OF THE INVENTION

In U.S. Pat. No. 3,116,516 issued Jan. 7, 1964 to Ernest P. Moslo and entitled BOTTLE BLOWING MACHINE, there is disclosed a bottle blowing machine of the parison type for automatic production of plastic bottles. The machine of such patent comprises three molds with corresponding mold clamps positioned side by side, with two groups of parison core rods adapted to be selectively disposed within adjacent pairs of the molds so that when the core rods are disposed in such adjacent molds the molds may be closed with the central mold of the group being adapted for injection molding of parisons onto the associated core rods, and the laterally disposed side molds being adapted for blow molding the finished articles. After the blowing operation the molds are opened vertically and the core rods are raised vertically with respect to the open molds and the finished bottles are ejected from the group of core rods associated with the blow mold.

In U.S. Pat. 3,264,684 issued Aug. 9, 1966 to Ernest P. Moslo and entitled NECK RING MOLD, there is disclosed a machine of the aforedescribed general type wherein a separable neck mold section is provided which is adapted to form the neck portion of the molded article, and which is adapted for coaction with a body mold section, the latter forming the body portion of the molded article. In such arrangement, the neck mold sections have to be very accurately machined and precisely arranged so as to fit in tight fitting relationship against the respective body mold section of the mold to prevent escape of plastic material during the injection molding procedure, and when the body mold sections are opened vertically to for instance permit the formed parison to be moved vertically from the parison mold into a blow mold, or to permit the blown article to be removed vertically from the blow mold, frictional interference oftentimes occurs, between the relatively movable neck mold sections and respective body mold sections during opening (and also during closing) movements of the molds.

In U.S. Pat. 3,480,994 issued Dec. 2, 1969 to Ernest P. Moslo and entitled PARISON-TYPE BOTTLE BLOWING MACHINE, there is disclosed a parison-type machine of the aforediscussed general type wherein the blow mold portions of the machine have movable rear wall sections for providing for ready removal of a molded article from the blow mold, when the article has for instance an indented portion formed in its bottom or rear wall, which would ordinarily cause interference between the mold and formed article during vertical removal of the latter from the mold.

SUMMARY OF THE INVENTION

The present invention provides a parison-type blow molding machine which has generally separable neck mold sections and body mold sections for forming the complete mold cavity in the production of parisons and blown articles, and wherein the mold sections are openable generally vertically to permit parisons to be transferred from the parison mold into the blow mold, and wherein pressure means is provided coacting with the mold sections for urging the latter together longitudinally into tight abutting relationship during actuation of the pressure means, while providing for ready vertical movement of the body mold sections with respect to the associated neck mold sections during opening and closing of the molds and while the pressure means is deactuated.

Accordingly, an object of the invention is to provide a parison-type bottle or other article, blow molding machine which has an improved arrangement for maintaining the neck mold sections and the body mold sections of a mold cavity in tight fitting coacting relationship during injection of the stock material into the parison mold and during blow molding of the articles in the blow mold.

Another object of the invention is to provide a machine of the aforedescribed type wherein the neck mold sections comprise mold halves which are openable and closable relative to one another generally vertically and wherein the body mold sections comprise openable and closable halves which are relatively movable vertically with respect to one another, and wherein means are provided for permitting ready noninterfering vertical movement of the body mold sections with respect to the neck mold sections while providing for maintenance of a tight-fitting coaction in a longitudinal direction between the neck mold sections and the body mold sections during molding operations.

A still further object of the invention is to provide a machine of the aforediscussed type having movable rear wall mold sections for the blow mold stations of the machine, so that such rear wall sections can be moved out of interfering relation with the formed article or bottle, to permit opening of the mold and vertical removal of the formed bottle from the mold, without interference with the respective rear wall section of the mold.

A still further object of the invention is to provide a blow molding machine of the aforediscussed type wherein the neck mold sections are secured to means providing for generally vertical opening of the neck mold sections away from the neck of the formed article, for discharge of the article from the mold and wherein the last-mentioned means includes complementary converging means for causing opening movement of the neck mold sections.

A further object of the invention is to provide a blow molding machine of the above-discussed type wherein the means for urging the neck mold sections and body mold sections longitudinally into tight-fitting relationship include a plurality of laterally spaced fluid powered relatively small piston and cylinder units adapted when actuated to coact with one of the mold sections for urging the latter tightly against the other mold section, and when deactuated providing for ready relative vertical movement between the body mold section and respective neck mold section.

Other objects and advantages of the invention will be apparent from the following description taken in conjunction with the accompanying drawings wherein:

BRIEF DESCRIPTION OF THE DRAWINGS

FIG. 2 is a diagrammatic side elevation of the machine shown in FIG. 1;

FIG. 3 is a fragmentary sectional view of the parison mold and left-hand blow mold station of the machine of FIGS. 1 and 2, illustrating the neck and body mold sections and the arrangement for causing opening movement of the neck mold sections to permit discharge of the molded article from the respective core rod after opening of the body mold sections;

FIGS. 10 and 10A are schematic illustrations of control circuitry for automatically controlling the operations of the bottle blowing machine and are substantially identical to respectively FIG. 7 of aforementioned U.S. Pat. No. 3,480,994 and FIG. 34A of aforementioned U.S. Pat. 3,116,516, except for the addition to the circuitry of control means for actuating and deactuating the pressure means controlling the aforementioned relative longitudinal abutting movement of the neck mold sections and body mold sections.

Figure 1:
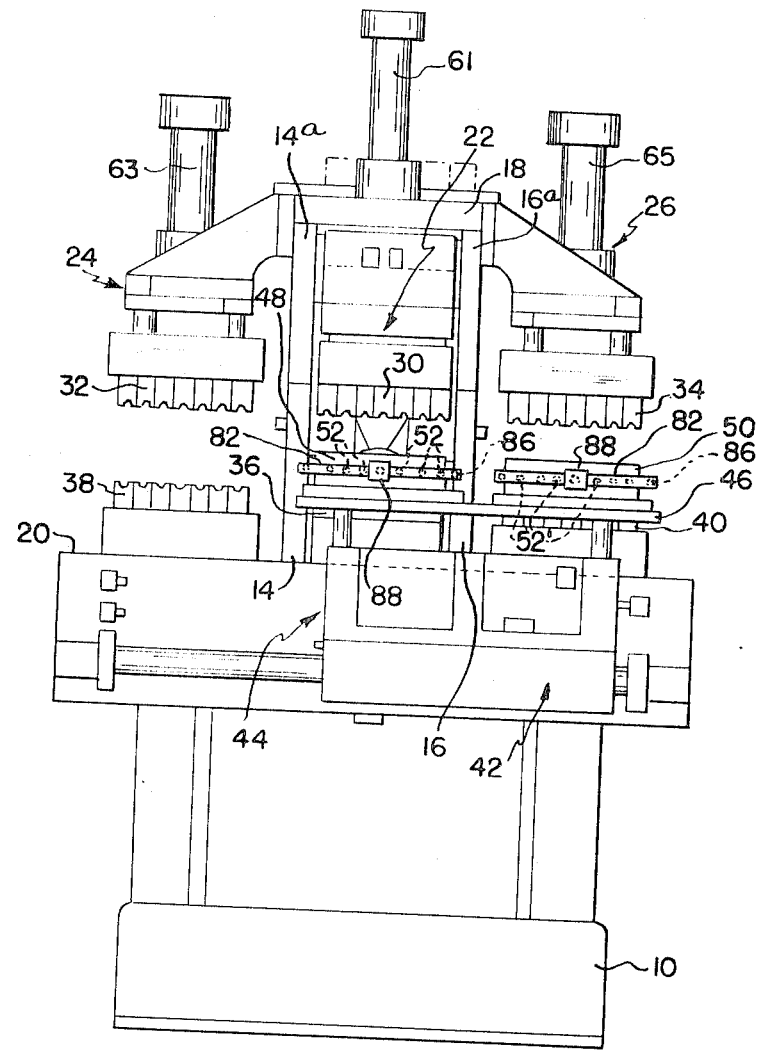
FIG. 1 is a diagrammatic front elevation of a bottle blowing machine embodying the invention, the molds being illustrated in open condition.

Referring now again to the drawings, the parison-type bottle blowing machine illustrated in FIGS. 1 and 2 can comprise a base 10 supporting a bed 12 adjacent the rearward or right-hand end (FIG. 2) of the machine. At the forward or left-hand end of the machine there may be provided generally vertically extending mold clamp-supporting members 14 and 16 spaced laterally of either side of the longitudinal vertical center plane of the machine, and connected adjacent the upper ends thereof by means of cross structure 18. A lower mold support base 20 extends transversely of the machine adjacent its forward end. The forwardly projecting portions 14a and 16a of the supporting members 14 and 16 provide a mounting for a central parison mold clamp assembly 22 positioned therebetween. A left blow mold clamp assembly 24 may be mounted on the outer side of supporting member 14 and a right blow mold clamp assembly 26 may be secured to the outer side of support member 16.

The parison mold clamp assembly 22 can include a vertically reciprocal fluid-powered piston and cylinder motor unit 61 adapted to vertically move an upper parison mold half 30. In a similar manner the blow mold clamp assemblies 24 and 26 can include reciprocal fluid-powered cylinder and piston motor units 63 and 65 respectively, for moving vertically the upper blow mold halves 32 and 34 respectively, such mold halves when closed defining generally the body section of the mold cavity of the respective mold. In the machine illustrated, seven mold cavities are shown for each blow mold station and the parison mold station, but it will be understood that this is illustrative only.

The aforementioned support base 20 supports the lower mold halves of respectively the parison mold and the blow molds between each of the mold clamp assemblies. The lower parison mold half is designated by reference number 36 and the lower halves of the left and right blow mold portions are designated by respectively reference numbers 38 and 40.

Figure 3A:
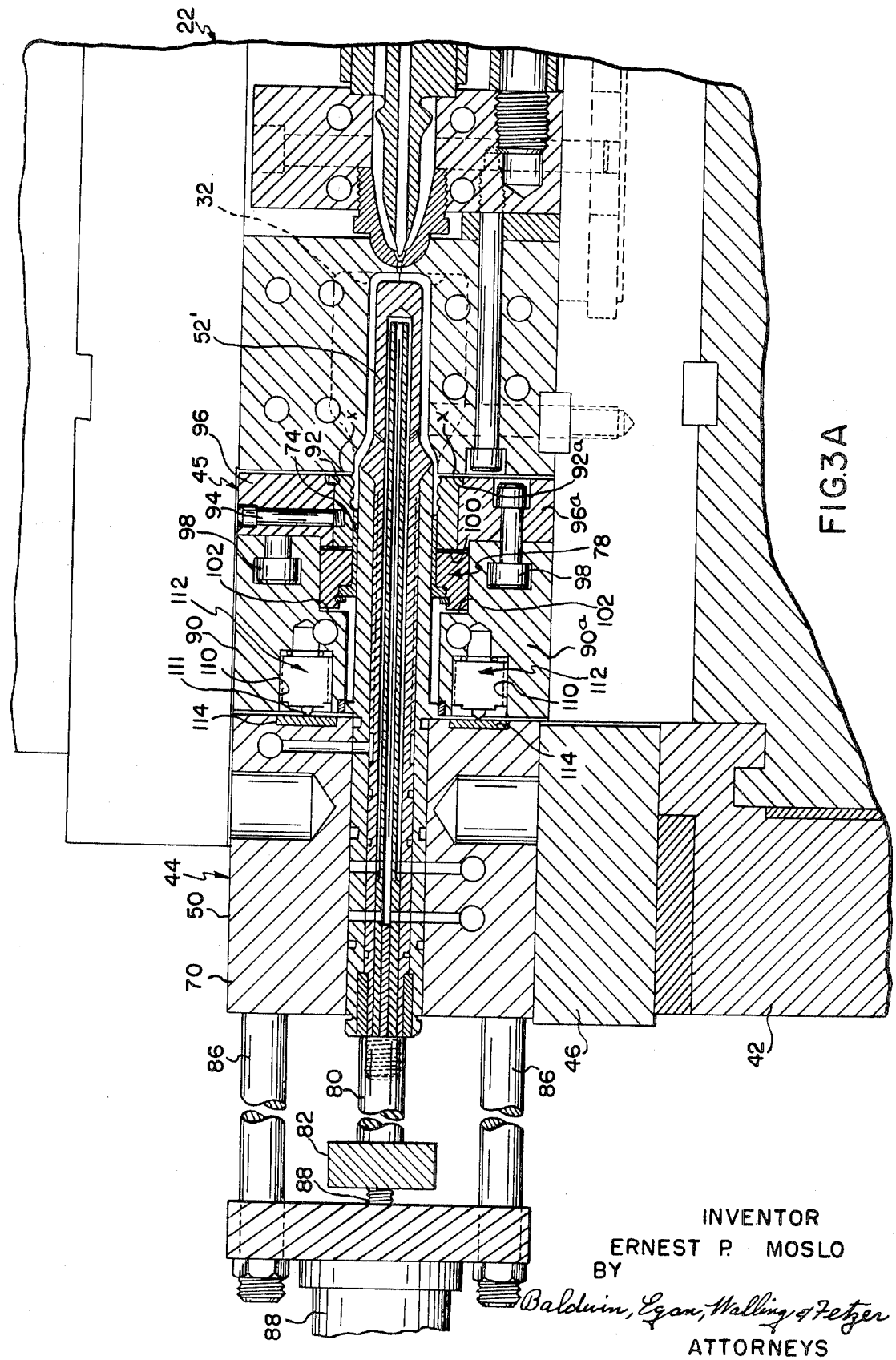
FIG. 3A is an enlarged vertical sectional view taken generally along the plane of line 3A—3A of FIG. 3, illustrating in particular the neck mold section assembly including the associated upper and lower wedge block members respectively mounting the upper and lower neck mold sections, and mounting the pressure means which are operable to urge the neck mold sections into tight longitudinal abutment with the body mold sections; the coaction of the plastic injection mechanism with the parison body mold sections is also illustrated.
Figure 4:
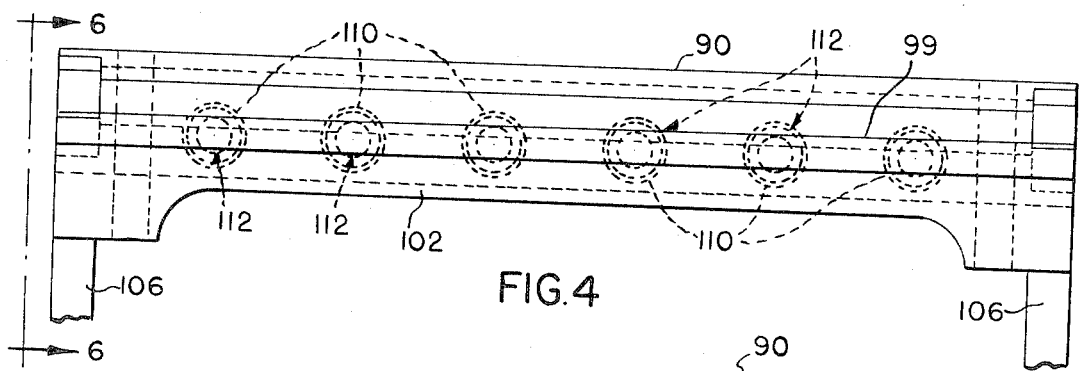
FIG. 4 is an enlarged rear side elevational view of the upper wedge block member for accomplishing opening movement of the mold neck sections and which mounts thereon the pressure means for urging the neck and body mold sections into tight longitudinal engagement.
Figure 6:
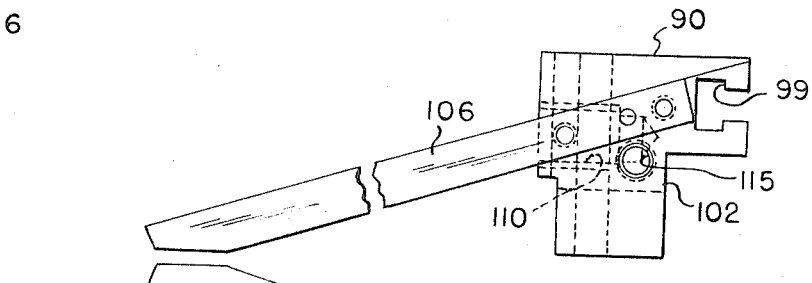
FIG. 6 is an end elevational view taken along the plane of line 6—6 of FIG. 4 but illustrating both the upper wedge block of FIG. 4 and the coacting lower wedge block, with the lower wedge block being generally identical to the upper block except that it is reversed or upsidedown. The upper wedge block is adapted to support the upper half of the respective neck mold sections and the lower wedge block is adapted to support the lower half of the respective neck mold sections.
Figure 5:
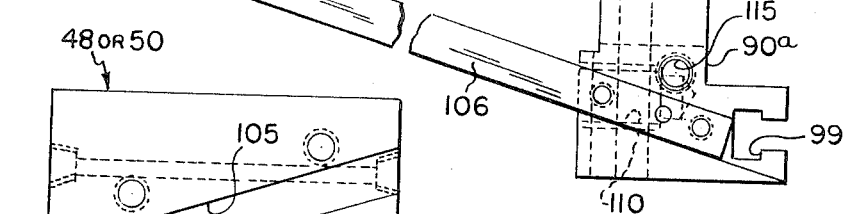
FIG. 5 is a top plan view of the FIG. 4 wedge block.
Figure 7:
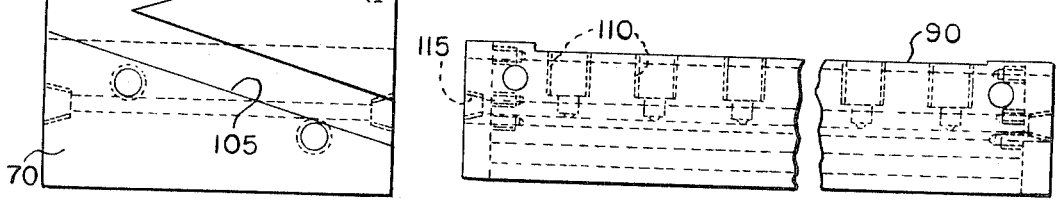
FIG. 7 is an enlarged vertical sectional view taken generally along line 7—7 of FIG. 3 illustrating the core rod support member for the openable and closeable wedge blocks and illustrates the converging slots disposed therein for coacting with the obliquely arranged keys on the wedge blocks of FIG. 6 for causing said opening and closing movements of the wedge blocks, and thus opening and closing of the mold neck sections.
Figure 8:
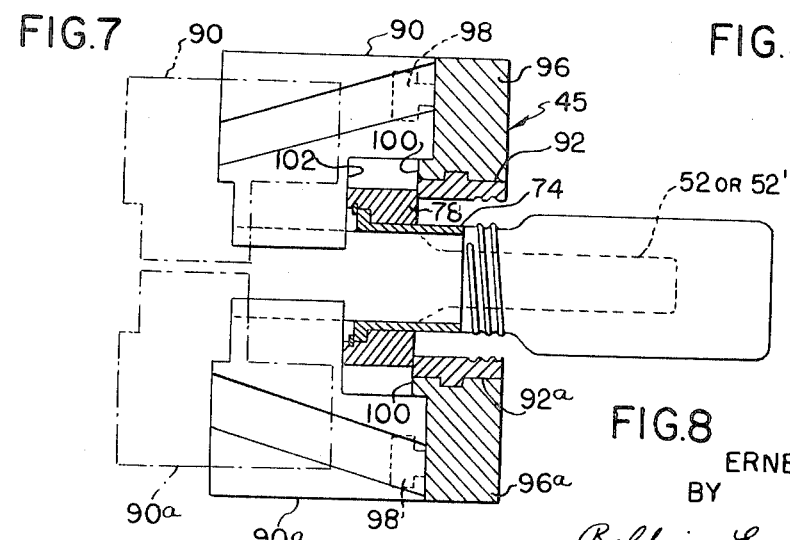
FIG. 8 is a diagrammatic vertical sectional illustration of the wedge blocks of FIG. 6 and attached upper and lower neck mold sections showing in dotted lines the closed position of the wedge blocks and in full lines the open position thereof and with respect to the associated core rod and formed bottle.

A table shifting assembly 42 may be mounted upon the front or forward side of the support base 20 and is adapted to move laterally between the positions shown in FIG. 1 wherein it is disposed generally adjacent the parison mold station and the right-hand blow mold station, to a position wherein the assembly 42 would be positioned generally adjacent the parison mold station and the left-hand blow mold station. The table shifting assembly 42 supports and carries with it in its lateral movement the parison core rod holder assembly indicated generally at 44 and associated neck mold assemblies 45 (FIGS. 2 and 3).

Core rod holder assembly 44 comprises in general, a vertically shiftable table 46 upon which are mounted a pair of laterally spaced core rod holders 48 and 50 and associated aforementioned neck ring mold assemblies 45. In the position of the core rod holders illustrated in FIG. 1 the core rods 52 associated with the core rod holder 48 are positioned between the parison mold halves 30 and 36 and the core rods 52' associated with the right-hand core rod holder 50 are positioned between the right-hand blow mold halves 34 and 40. When the table shifting assembly moves all the way to the left from the right-hand position illustrated in FIG. 1, the core rods 52 of the left-hand core rod holder 48 would be disposed between the left-hand blow mold halves 32 and 38 while simultaneously the core rods 52' of the right-hand holder 50 would be disposed between the parison mold halves 30 and 36 (FIG. 3).

The bed 12 of the machine can support a plastic material injection assembly 54 (FIG. 2) which in the embodiment illustrated is adapted for movement toward and away from the lower parison mold half 36 by means of a slideway 56 mounted on the upper surface of the bed 12. Assembly 54 can be of any suitable type and in the embodiment illustrated comprises a hopper 58 into which molding material, such as any suitable plastic material is fed, in for instance a granular state. A material feed mechanism transfers the granular molding material in predetermined amounts forwardly to a funnel mechanism 60 from which it drops into a packing cylinder 62. Rearwardly of the packing cylinder there may be provided an injection cylinder 64 having a forwardly and rearwardly reciprocating or movable ram adapted for propelling the granular molding material in a forward direction into a material-heating chamber of plasticizing head 66 and in the known manner. The material-heating chamber is adapted to be so positioned adjacent the parison mold station in communication with spaced nozzles at the forward end of the plasticizing head so that when the parison mold is closed upon the associated core rods, parisons may be injection molded upon the core rods and as disclosed in aforementioned U.S. Pat. No. 3,116,516.

Referring now to FIGS. 3 through 8, each core rod holder 48 or 50 comprises a support 70 secured to table 46 and mounting a plurality (in the embodiment illustrated) of laterally spaced, longitudinally extending core rod members 52 or 52' thereon, which core rod members are adapted to be received between the mold halves of the respective parison and blow mold stations, and upon which the parisons are formed at the parison molding station, and upon which the articles (e.g., bottles) are blown at the respective blow mold station.

Each of the core rods has a stripper member 74, which in the embodiment illustrated is of a cylindrical configuration, encompassing the respective core rod member. The stripper member 74 is adapted to define the forward or upper end of the neck section of the respective blown article, such as a bottle, and upon rearward movement of the stripper member 74 with respect to its respective core rod member, the bottle is physically urged rearwardly off the core rod after completion of the blowing operation at the respective blow mold station and opening of the molds, and in the general manner described in the aforementioned U.S. Pat. No. 3,264,684. Stripper members 74 are secured to transversely extending stripper bar 78 which likewise encompasses the core rod members 52 or 52' of the respective core rod support member 70. Bar 78 at its lateral extremities is secured to rods 80 (FIG. 3) which in turn at the forward ends thereof are connected to crossbar 82 and, as by means of nuts 82a. Rods 80 extend through openings 84 in the respective core rod support member 70 and are reciprocal therein. Mounted on each respective core rod support member 70 as by means of support structure 86, is a reciprocal double acting preferably air powered motor unit 88, with the piston rod 88a thereof being connected to crossbar 82. It will be seen, therefore, that when the molds are open and the table 46 is in raised condition, upon outward actuation of the respective motor unit 88, the bar 82 is moved rearwardly away from the motor unit therefore, moving the stripper bar 78 rearwardly along the respective series of core rod members and, upon retraction of the motor unit 88, the stripper bar 78 is moved forwardly along the respective core rod members, and generally as disclosed in U.S. Pat. No. 3,254,684.

Encompassing stripper bar 78 are forwardly disposed upper and lower wedge block members 90, 90a (FIGS. 3, 3A, 4, 5 and 6) and a rearwardly disposed aforementioned neck ring mold assembly 45 which is attached to the wedge blocks. Each neck mold assembly 45 comprises an upper neck mold section 92 and a lower neck mold section 92a for each of the associated core rods 52 or 52', with the neck mold sections 92, 92a being secured as by means of fasteners 94 to a respective upper or lower support member 96, 96a. Upper and lower support members 96, 96a may be secured to the respective upper and lower wedge members by means of headed fasteners 98, which are received in a transversely extending slot 99 (FIG. 4) in the respective wedge member.

Upper and lower neck mold sections 92, 92a and attached upper and lower support members 96, 96a provide shoulder portion 100 adapted for engagement with the stripper bar 78 during rearward movement of the stripper bar with respect to the associated core rods 52 or 52', while the upper and lower wedge members 90, 90a provide shoulder portion 102 adapted for engagement with the stripper bar upon forward movement of the stripper bar. Thus the wedge members 90a, 90a and the neck mold assemblies 45 move longitudinally upon longitudinal movement of the associated stripper bar 78. Each core rod support 70 has laterally spaced sets of converging cam slots 105 (FIGS. 3 and 7) therein adapted to receive the respective pair of converging keys or cams 106 (FIG. 6) of the upper and lower wedge block members 90, 90a, for causing opening and closing movement of the wedge blocks and thus opening and closing movement of the associated neck mold sections 92, 92a during longitudinal shifting movement of the stripper bar 78 with respect to the associated core rods 52 or 52', and in a generally similar manner as disclosed in aforementioned U.S. Pat. No. 3,264,684.

Figure 9:
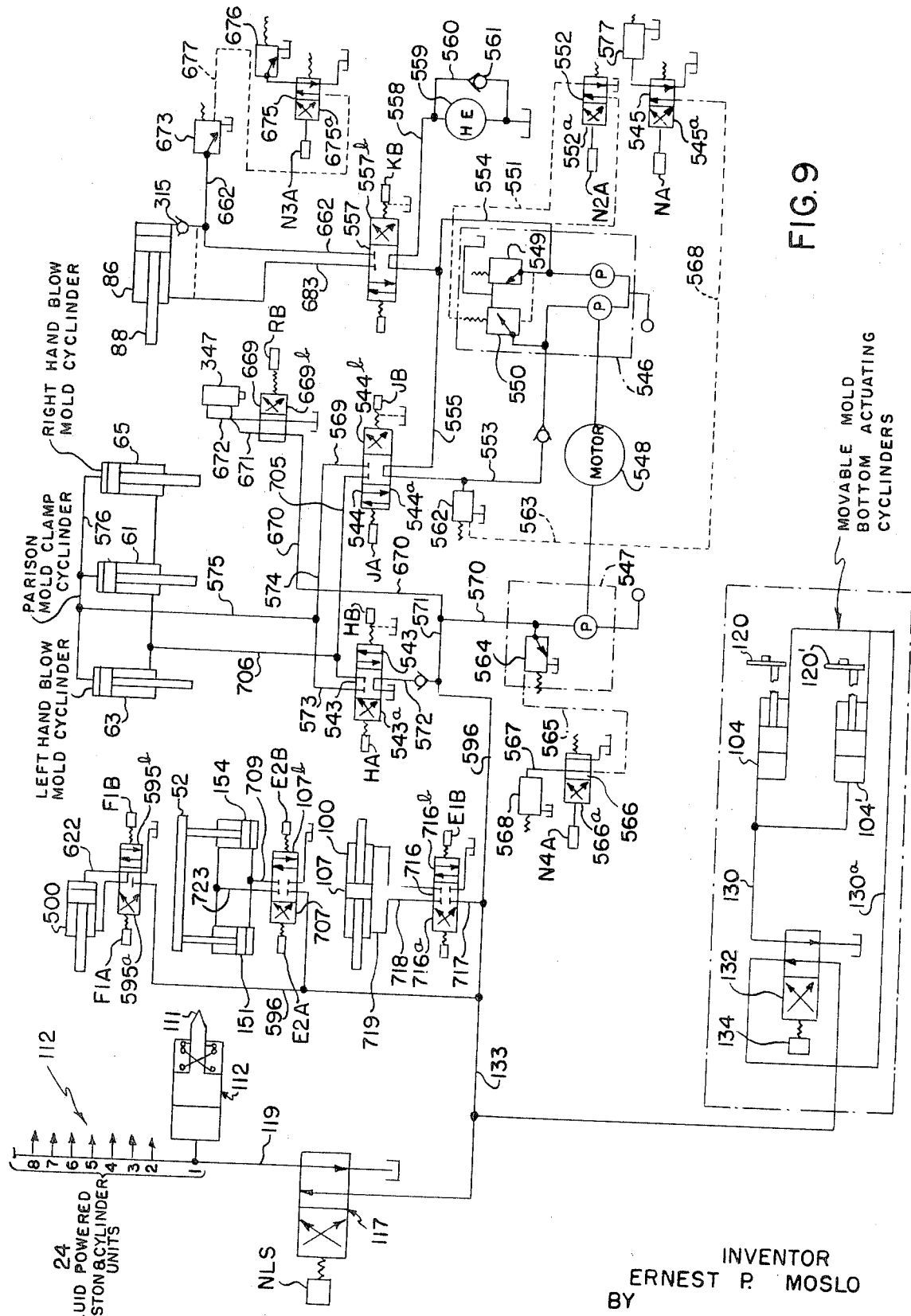
FIG. 9 is a schematic illustration of fluid powered pressure means for urging the neck mold sections and body mold sections longitudinally into tight-fitting engagement together with control means for actuating the pressure means and as coupled into the hydraulic circuit illustrated in FIG. 35 of aforementioned U.S. Pat. No. 3,116,516 and FIG. 6 of aforementioned U.S. Pat. No. 3,480,994.

In accordance with the present invention, the upper and lower wedge block members 90, 90a each have a series of laterally disposed forwardly facing cavities 110 (FIGS. 3, 3A, 4 and 5) formed therein, with each of the cavities receiving therein a pressure applying means 112. In the embodiment illustrated, there are six pressure-applying means coupled in parallel and mounted in each of the upper and lower wedge block members, the latter forming holder means for the pressure applying means. The pressure-applying means comprise fluid pressure actuated piston and cylinder units of relatively small size, which may be threaded on their exterior for conveniently mounting in the associated cavities 110 in the wedge block members. The pistons of the pressure units are preferably spring returned as shown in FIG. 9 and the piston rods thereof at their distal ends are generally pointed as at 111 to apply point pressure. The pressure means are adapted to engage wear plates 114 mounted on the associated core rod support member 70 (FIG. 3A) to reduce wear at the engagement of the piston rods of the pressure means with the associated core rod support member. It will be seen that, upon application of fluid pressure to the pressure means as via port 115 (FIG. 4), the wedge block members and associated neck mold assembly 45 are urged longitudinally rearwardly as a unit with respect to the associated core rod support 70. In this connection, there is provided a clearance X (FIG. 3A) as, for instance, one sixty-fourth of an inch, between the neck mold section assembly 45 and the associated body mold section (FIG. 3A) so that in the deactuated condition of the pressure-applying means 112, when the body mold section is raised vertically with respect to the neck mold section to open the molds, no frictional interference will ordinarily occur between the neck mold section and the associated body mold section during upward (and also downward) movement of the body mold sections. However, when the pressure cylinder units 112 are actuated, the wedge members and attached neck mold assembly are urged rearwardly whereby the neck mold assembly tightly engages the confronting body mold section. When fluid pressure is released from the pressure cylinders 112, the spring returns thereof automatically permit longitudinal slack to reoccur between the neck and body mold sections.

It will be understood that sufficient slack is provided between stripper bar 78 and the shoulder portions 100, 102 so that the wedge members and associated neck mold sections can move longitudinally relative to the stripper bar during actuation and deactuation of pressure units 112.

The pressure-applying units 112 are preferably spaced evenly along the wedge block members 90, 90a so as to uniformly urge, when actuated, the neck mold sections rearwardly, and without distortion of parts. As an example of the size of pressure units 112, they each may have an overall length of approximately 1½ inches and a diameter of approximately 1 5/16 inches, with a stroke of approximately 3/16 inch.

Briefly, the operation of the machine may be as follows assuming for instance that the core rod holders 48 and 50 are positioned in the position illustrated in FIG. 1, and with the parison mold including the body mold sections 30 and 36 and the left- and right-hand blow molds including their respective body mold sections 32, 38 and 34, 40 are closed. Thus the core rods 52 of holder 48 will be disposed in the parison mold cavities and the core rods of holder 50 will be disposed in the mold cavities of the right-hand blow mold station of FIG. 1. In this position, parisons are molded upon the core rods 48 by means of the stock material injection assembly 54, and concurrently with the injection molding at the parison molds, the articles or bottles are blown in the right-hand blow mold station from previously formed parisons, and as described in aforementioned U.S. Pat. No. 3,116,516.

After the bottles have been blown at the right-hand blow mold station and the parisons have been injected at the centrally disposed parison mold station, the molds are opened with the upper half body mold section 32 of the left-hand blow mold station being raised by the left blow mold clamp assembly 24, the upper parison body mold section half 30 being raised by the parison mold clamp assembly 22, and the upper body mold section half 34 of the right-hand blow mold being raised by the right-hand blow mold clamp assembly 26. After the body section mold halves have opened a short distance, the parison station core rods and the blow mold station core rods, together with the respective wedge members 90, 90a and associated neck mold assemblies 45 are raised vertically by the table 46. When the body mold sections are opened fully, the core rods are disposed generally centrally between the upper and lower body mold halves due to the aforementioned raising by the table 46, at which point the stripper bar 78 at the right-hand blow mold station is moved longitudinally rearwardly with respect to the associated core rods 52' to cause opening of the associated neck mold sections 92, 92a and stripping of the newly blown articles or bottles from the associated core rods and preferably in conjunction with air pressure in the manner described in aforementioned U.S. Pat. Nos. 3,116,516 and 3,264,684.

Figure 10A:
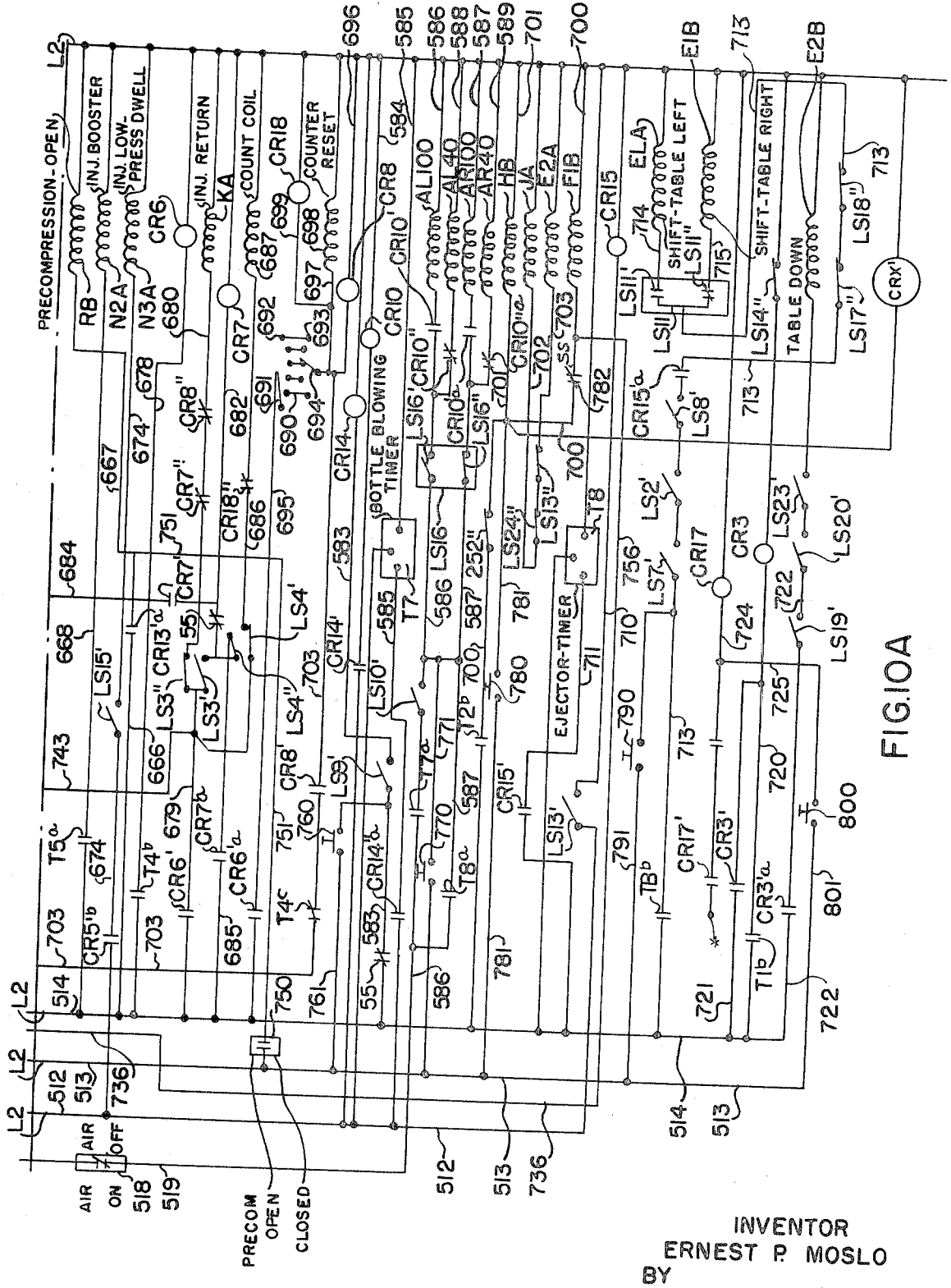

In this connection, with the bottles fully blown at the blow mold station, the mold clamp timer T2 (line 534—FIG. 10) times out, thereby opening contacts T2a, deenergizing CR4 in line conductor 535 (FIG. 10), opening contacts CR4' and CR4'a in line conductors 536 and 538 (FIG. 10) and deenergizing the clamp close solenoids HA and JB (FIG. 10). Valves 543 and 544 are thereby allowed to return to their neutral or normal position as shown in FIG. 9. However, at the same time contacts T2b, in line conductor 700 of FIG. 10A, close to cause the clamps 22, 24 and 26 to open.

Contacts T2b are disposed as aforementioned in conductor 700, which also has connected in series therewith the normally closed contacts LS2" of limit switch LS2. The conductor 700 is connected across the lines 514 and L2 and has interposed therein in series injection nozzle retract solenoid F1B (FIGS. 9 and 10A). Conductor 701 is connected from the conductor 700 across to L2 and thus clamp open solenoid HB is energized. Line conductor 702 is likewise connected from the conductor 700 to L2 and is adapted to energize clamp open solenoid JA. Line conductor 703 is connected across from conductor 700 to line L2 for energization of "table-up" solenoid E2A (FIGS. 9 and 10A).

It will be noted that a relay CRX' is connected across line conductor 700 and line conductor L2 at the juncture of line conductor 700 with line conductor 701 (FIG. 10A). Therefore, relay CRX' is energized upon closing of aforementioned contacts T2b. This causes the contacts CRX" (FIG. 10) of relay CRX' to open, thereby deenergizing the neck ring lock solenoid NLS (FIGS. 9 and 10) of valve 117 (FIG. 9) which causes fluid pressure from line 133 to be cut off from the pressure-applying cylinders 112 and venting of supply line 119 to tank. Accordingly, the pistons of units 112 are returned to deactuated condition by the associated springs of the pressure-applying cylinders. Accordingly, the neck mold sections 92, 92a are released from their being urged longitudinally against the respective body mold sections to permit the mold body sections to be opened as aforedescribed without interference from the neck mold sections.

As described in aforementioned U.S. Pat. No. 3,116,516, upon closing of the parison molds and the blow molds, the limit switch LS1 is tripped by the downwardly moving cam 475. Contacts LS1' of the limit switch LS1 are thereby closed, energizing control relay CR11 through line conductor 580 (FIG. 10). Conductor 580 is connected between the lines 512 and L2, with LS1' and CR11 connected in series therein. Normally open contacts CR11" in line conductor 581 (FIG. 10) thereby close. Conductor 581 is connected between the lines 512 and L2 and has interposed therein in series a full pressure control solenoid N4A. At the same time a second pair of normally open contacts CR11'a (FIG. 10) close to start injection delay timer T3. It will be seen that upon closing of contacts CR11'a in line conductor 582 of FIG. 10, the aforementioned neck ring lock solenoid NLS of control valve 117 is energized since the relay contacts CRX" (FIG. 10) of relay CRX' are closed, thereby causing application of fluid pressure to the pressure applying cylinders 112 via supply line 119 and entry port 115 in the respective wedge member 90, 90a, and thus causing urging of the wedge block members 90, 90a and associated neck mold section assemblies 45 into tight abutting engagement with the body mold sections of the respective parison and blow molds. This prevents any leakage of stock material between the neck and body mold sections during the injection molding process.

As best shown in FIGS. 2 and 9, the blow molds may also have movable rear wall sections 120 for providing for convenient removal of the molded articles or bottle from the blow mold when the rear or bottom wall of the formed bottle has an indented portion, which would ordinarily cause interference between the mold and the formed bottle during vertical movement of the core rods with the formed article thereon, from the mold as aforedescribed. Such movable rear wall portions 120 of the blow mold construction may be actuated by means of the fluid pressure double acting motor units 104, 104' as shown in FIG. 9, and as described in aforementioned U.S. Pat. No. 3,480,994.

From the foregoing discussion and accompanying drawings it will be seen that the invention provides a novel blow molding machine for making hollow articles comprising a generally central parison mold and blow molds disposed on either side of the parison mold, with the molds comprising relatively movable neck mold sections and relatively movable upper and lower body mold sections, and with pressure-applying means being provided coacting with the mold sections for urging the latter longitudinally together for maintaining a tight abutting relationship between the neck mold sections and the body mold sections in the closed condition of the molds, so that leakage during injection molding can not occur between the body and neck mold sections in the actuated condition of the pressure-applying means. Clearance or slack is provided between the neck and body mold sections in the deactuated condition of the pressure-applying means so that the body mold sections can be opened or moved relative to the neck mold sections without frictional interference occurring between the neck mold sections and the body mold sections. Heretofore when molds were opened preparatory to moving the core rods from one side of the machine to the other side thereof, frictional interference between the neck mold sections and the body mold sections retarded opening movement of the body mold sections and/or created wear at the juncture between the mold sections.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

I claim:

1. In a blow molding machine for making hollow articles such as bottles, comprising a generally central parison mold and a pair of blow molds disposed one on either side of the parison mold, said molds comprising upper and lower halves, said halves being relatively movable with respect to one another for opening and closing the molds in a generally vertical direction, said halves when closed defining generally the body section of the mold cavity of the respective mold, laterally and vertically shiftable means adapted for coaction with the molds with a pair of core rod means mounted on said shiftable means and laterally spaced so as to be alternately projected between the halves of pairs of adjacent molds one of which is always said parison mold, laterally spaced neck mold sections mounted on said shiftable means in coacting relation with respective of said core rod means and adapted for coaction with confronting of said body mold sections for defining the parison and blow mold cavities, each neck mold section comprising a pair of coacting halves movable relative to one another for opening and closing said neck mold sections, and means operable from an inactive to an active condition and vice versa, the last-mentioned means coacting with said mold sections for urging the latter longitudinally into tight abutting relation with respect to one another for preventing leakage between the body and neck sections of the respective mold in the active condition of said last-mentioned means, and in said inactive condition, said last-mentioned means providing for ready vertical movement of the body mold section with respect to the associated neck mold section during opening and closing of the molds.

2. A blow molding machine in accordance with claim 1 wherein said last-mentioned means comprises fluid pressure operated pressure-applying means operative when in said active condition to force a respective neck mold section longitudinally of the respective core rod means into tight coacting engagement with a confronting body mold section.

3. A blow molding machine in accordance with claim 1 including control means for automatically actuating said last-mentioned means to said active position upon closure of said molds.

4. A blow molding machine in accordance with claim 3 wherein said control means includes means for automatically deactuating said last-mentioned means upon completion of the blowing operation in said blow molds, whereby said body mold section can readily move vertically relative to the respective neck mold section for opening the mold.

5. A blow molding machine in accordance with claim 1 wherein said last mentioned means comprises a plurality of laterally spaced fluid-powered motor units operable when in said active condition to urge the neck mold sections into tight fitting relation against the respective body mold sections of the mold cavities and for permitting clearance between said sections when said motor units are deactuated.

6. A blow molding machine in accordance with claim 1 wherein said core rod means is sequentially shiftable upwardly, laterally, and downwardly by said laterally and vertically shiftable means, and from positions within one lower blow mold body section half and lower parison mold body section half, to positions respectively within said lower parison mold body section half and the other blow mold body section half each time said molds are opened.

7. A blow molding machine in accordance with claim 1 wherein said blow molds comprise movable rear wall sections defining the respective blow mold cavity, said rear wall sections being movable out of interferring relation with the formed bottle prior to removal of the formed article from the associated blow mold.

8. A blow molding machine in accordance with claim 1 including holder means for said last-mentioned means, said holder means including cam means thereon, said neck mold sections being supported by said holder means, and means coacting with said cam means for causing vertical separation of said neck mold sections for permitting ejection of the blown article from the respective core rod means after opening of the blow molds.

9. A blow molding machine in accordance with claim 6 wherein each of said core rod means comprises a support fixedly mounted on said laterally and vertically shiftable means, with laterally spaced core rods projecting rearwardly therefrom, upper and lower wedge members encompassing said core rods for longitudinal movement relative thereto, said last-mentioned means comprising a series of laterally spaced fluid pressure actuated reciprocal motor units mounted in each of said wedge members, said neck mold sections being supported by said wedge members, and means for causing vertical opening movement of said neck mold sections for permitting ejection of the blown article from the respective core rod means after opening of the molds, said vertical opening movement means being operable after completion of the blowing operation and deactuation of said motor units.

10. A blow molding machine in accordance with claim 9 wherein each of said supports of said core rod means includes wear plates adapted for coaction with said motor units at the engagement of said motor units with said supports for preventing wear therebetween.

11. A blow molding machine in accordance with claim 9 wherein each of said motor units comprises a fluid powered, reciprocal piston and cylinder unit with the piston rod thereof having a generally pointed configuration at its distal end for application of point pressure to the respective of said supports, and means on each motor unit for securing it to the respective wedge members.

12. A blow molding machine in accordance with claim 9 wherein said vertical opening movement means comprises cam means on said wedge members coacting with cam means on the respective of said supports, and means coacting with said wedge members and said neck mold sections for causing longitudinal shifting movement of the latter with respect to the core rod means, thereby causing actuation of said vertical opening movement means.

* * * * *